United States Patent
Simmons et al.

(10) Patent No.: US 10,223,932 B1
(45) Date of Patent: Mar. 5, 2019

(54) TRAINER HAND WITH RELEASABLE NAIL

(71) Applicants: David Simmons, Suffolk (GB); John Grace, Suffolk (GB)

(72) Inventors: David Simmons, Suffolk (GB); John Grace, Suffolk (GB)

( * ) Notice: Subject to any disclaimer, the term of this patent is extended or adjusted under 35 U.S.C. 154(b) by 180 days.

(21) Appl. No.: 15/282,040

(22) Filed: Sep. 30, 2016

Related U.S. Application Data (60) Provisional application No. 62/235,237, filed on Sep. 30, 2015.

(51) Int. Cl.
*G09B 19/00* (2006.01)
*A45D 31/00* (2006.01)
*G09B 25/00* (2006.01)

(52) U.S. Cl.
CPC ......... *G09B 19/0076* (2013.01); *A45D 31/00* (2013.01); *G09B 25/00* (2013.01)

(58) Field of Classification Search
USPC .......... 434/99, 100, 267, 295, 296; 446/320, 446/321
See application file for complete search history.

(56) References Cited

U.S. PATENT DOCUMENTS

| | | | | |
|---|---|---|---|---|
| 2,223,842 A | * | 12/1940 | Brekke | G09F 19/10 434/100 |
| 3,691,679 A | * | 9/1972 | Kersten | A63H 3/36 446/320 |
| 4,403,442 A | * | 9/1983 | Blanco | A63H 3/36 434/267 |
| 4,685,929 A | * | 8/1987 | Monestier | A61F 2/583 623/64 |
| D348,482 S | * | 7/1994 | Cherry | D19/59 |
| 5,782,379 A | * | 7/1998 | Traub | A45D 31/00 132/285 |
| 6,488,506 B2 | | 12/2002 | Grace et al. | |
| 7,503,764 B2 | * | 3/2009 | Brown | G09B 19/10 434/100 |
| 2009/0263766 A1 | * | 10/2009 | Ozuna | G09B 19/00 434/100 |

OTHER PUBLICATIONS

The Nail Trainer—Your Perfect Model—UK—Website; retrieved from the internet: on Aug. 6, 2015 (Aug. 6, 2015) at URL: http://www.nailtrainer.com/thenailtrainer.html.

* cited by examiner

*Primary Examiner* — Kurt Fernstrom
(74) *Attorney, Agent, or Firm* — Myers Wolin, LLC (57) ABSTRACT

A training device is disclosed. The training device may be a mannequin hand that has an artificial tip having a channel, and a first and a second hole leading into the channel. It has an artificial nail having a surface simulating a nail, and having a first and a second post extending away from the surface. The first post and the second post fit into the first hole and into the second hole, respectively, in a friction fit, and the first post and the second post extend into the channel. A bar slidably mounts in the channel. The bar has at least four surfaces, two shaped to not contact the first post or the second post, and two having an incline that contacts individual posts increasing pressure as the bar slides in a direction in the channel. The bar also includes a lever.

16 Claims, 7 Drawing Sheets

TRAINER HAND WITH RELEASABLE NAIL

CROSS-REFERENCE TO RELATED APPLICATIONS

This application claims the benefit of U.S. Provisional Patent Application No. 62/235,237, filed Sep. 30, 2015, the entirety of which is hereby incorporated by reference herein.

BACKGROUND OF THE INVENTION

False nails are popular and attractive. The false nails are applied with an adhesive to the natural nail. Then the nail is shaped to give the effect of perfectly manicured natural nails. Applying and shaping a set of nails quickly and safely while achieving a satisfactory appearance requires skill. The adhesives used in attaching the false nails can cause discomfort if allowed to contact bare skin. Excessive abrasion in the preparation of the natural nail to receive the false nail can result in exposure of the underlying nail bed, causing the customer pain, even before contact by the adhesive. It can therefore take a great deal of training before an operator becomes proficient.

The use of mannequin hands is therefore useful in to train persons applying and manipulated artificial nails. Existing mannequin hands are lacking in several ways. For example, the nails are attached to the mannequin hands in an inconvenient manner. Since the nails are being manipulated, they need to be attached very securely to the mannequin hands. Currently, the nails cannot be attached in a secure enough fashion while still being convenient to remove. See, for example, U.S. Pat. No. 6,488,506.

Improvement of mannequin hands is therefore required.

SUMMARY OF THE INVENTION

The present invention is a training device, such as a mannequin hand, that has an easily removable artificial nail. In embodiments where the training device is a mannequin hand, the removable artificial nail is on one to five fingers. The artificial nail is securely attached to its artificial finger during training to allow the nail to be manipulated. In some embodiments, the removable artificial nail may be on one to five toes where the training device is a mannequin foot.

In accordance with one embodiment of the present invention, a finger of a mannequin hand includes an artificial tip having a channel and a first and a second hole leading into the channel. There is an artificial nail having a surface that simulates a nail, and a first and a second post that extends away from the surface. The first post and the second post fit into the first hole and into the second hole, respectively, in a friction fit. The first post and the second post extend into the channel and the surface is exposed on the artificial tip. A bar is slidably mounted in the channel. The bar has at least four surfaces. A first surface is shaped to not contact the first post when aligned with the first post. A second surface has an incline that contacts the first post with increasing pressure as the bar slides in a direction in the channel. A third surface is shaped to not contact the second post when aligned with the second post, similar to the first surface. A fourth surface also has an incline that contacts the second post with increasing pressure as the bar slides in the direction in the channel. The bar also has a lever.

In accordance with an aspect of the present invention, the lever extends outside the artificial tip.

In accordance with an aspect of the present invention, the first surface and the second surface have the same shape and the second surface and the fourth surface have the same shape. In one embodiment, the second surface and the fourth surface are ramp shaped.

In accordance with an aspect of the present invention, the artificial tip is a fingertip. The artificial tip can also be a toe tip.

In accordance with an aspect of the present invention, the first and the second posts are tapered so that a diameter of the first and second posts nearer to the surface is greater than a diameter of the first and second posts further from the surface.

In accordance with an aspect of the present invention, when the lever is moved, the bar slides in the channel in the direction so that the first post and the second post are removed from the first hole and the second hole, respectively.

In accordance with an aspect of the present invention, the artificial tip further comprises a bracket attached to the artificial tip on a first side of the channel and attached to the artificial tip on a second side of the channel so that the bracket spans across the channel and retains the mechanism in the channel.

In accordance with an aspect of the present invention, an artificial digit is attached to the artificial fingertip to simulate a finger.

In accordance with an aspect of the present invention, an artificial hand is attached to the artificial digit to simulate a hand.

In accordance with an aspect of the present invention, a pedestal is attached to the artificial hand that supports the hand.

In accordance with an aspect of the present invention, a full hand is provided. In this case, there are four additional digits attached to the hand, each of the four artificial digits having an artificial fingertip with a bar as explained above.

BRIE DESCRIPTION OF THE DRAWINGS

In the drawings, which illustrate exemplary embodiments of the different aspects of the invention.

DETAILED DESCRIPTION OF THE ILLUSTRATED EMBODIMENTS

Figure 1:
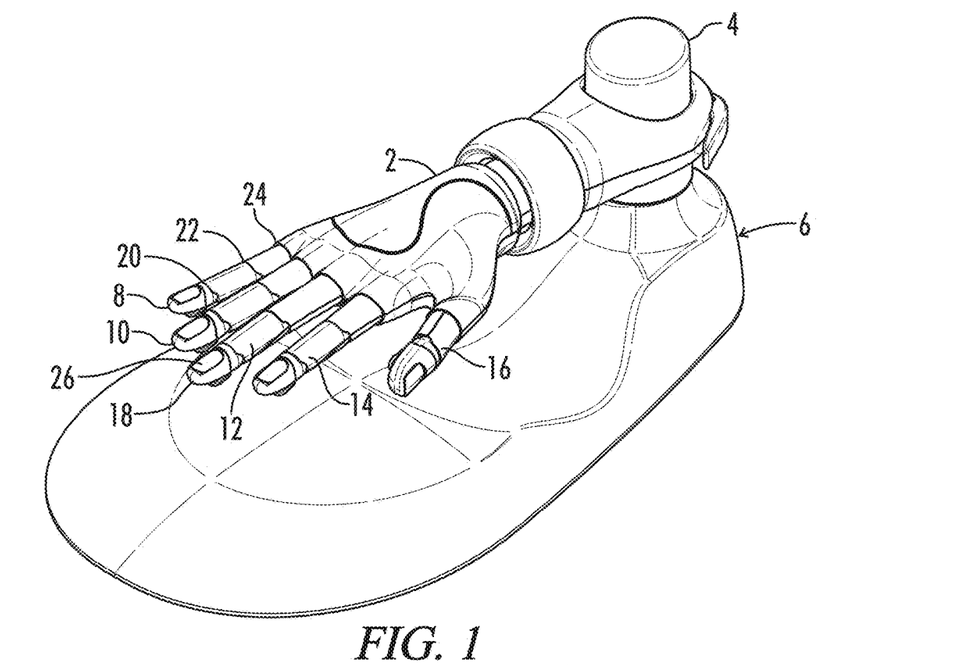
FIGS. 1 and 2 are perspective views of a training hand mounted on a pedestal in accordance with an aspect of the present invention.
Figure 2:
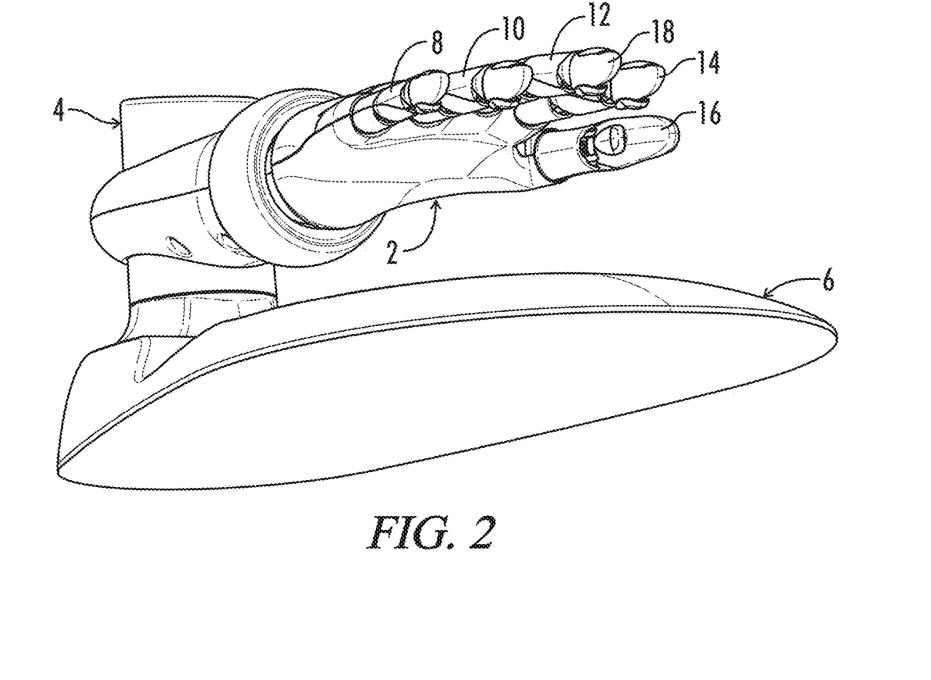

FIGS. 1 and 2 are perspective views of a training or artificial hand 2 mounted to a post 4 on a pedestal 6 in accordance with an aspect of the present invention. The artificial hand 2 includes five artificial digits, in this case, fingers 8, 10, 12, 14 and 16. Each artificial finger includes an artificial tip. Artificial tip 18 on finger 12 is noted in FIGS. 1 and 2.

The hand 2 is preferably designed to simulate as closely as possible the movement, flexibility and feel of a natural hand. The hand 2 is therefore provided with jointed fingers 8, 10, 12, 14 and 16. Three joints 20, 22 and 24 are illustrated on finger 8, but in an embodiment of the present invention, all of the fingers are provided with three joints, except the thumb has two joints. The joints are designed to have the same range and directions of movement of a natural hand.

In accordance with an aspect of the invention, each artificial tip 18 includes an artificial nail 26 that is removable. The details of the construction of the artificial tip 18 will be discussed later.

In accordance with a further aspect of the invention, each finger section is linked to the next by means of a simple rotary joint incorporating a jointing ligament formed of a relatively stiff material permitting rotation substantially only in a single plane. A third ligament (the second in the case of the thumb) joins the finger to the palm, and can be formed of a more flexible material, such as polyethylene, permitting a degree of rotation of the finger around the longitudinal axis thereof. A total rotation of about 30 degrees is sufficient to simulate that available in a typical natural finger. A suitable construction of the joints is described in U.S. Pat. No. 6,488,506, which is incorporated herein by reference.

Figures 3, 4, 5, 6:
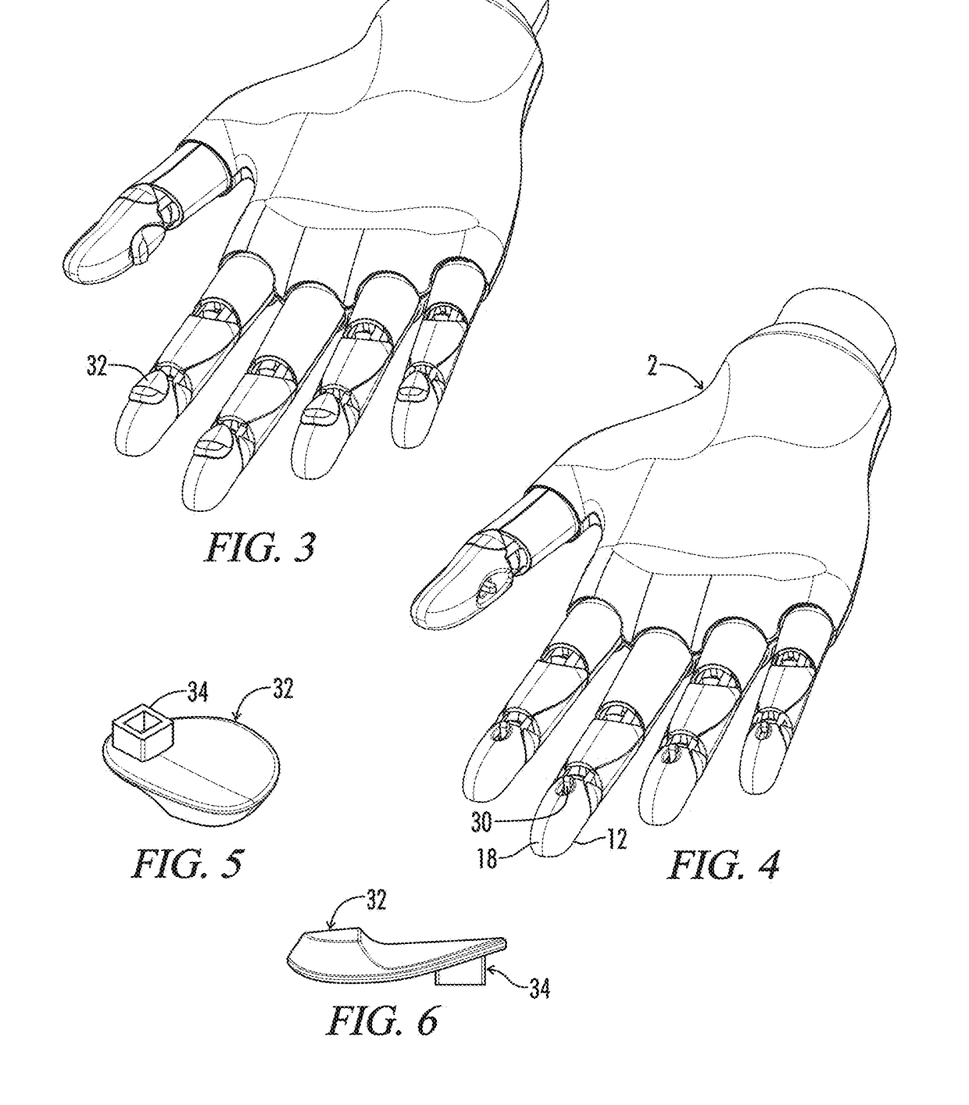
FIGS. 3 and 4 are perspective views of the underside of a training hand in accordance with another aspect of the present invention.
FIGS. 5 and 6 are perspective views of a component of the training hand in accordance with a further aspect of the present invention.

FIGS. 3 and 4 are perspective views of the underside of a training hand in accordance with another aspect of the present invention. FIG. 4 illustrates a hand 2 having artificial fingertips 18 with a lever 30 extending from the artificial digit. Although only one lever is noted, each of the artificial fingertips 18 has a lever 30.

Referring to FIG. 3, a device 32 has been placed on each of the levers 30. The device 32 includes a squared receptacle 34 which receives the lever 18 in a secure manner to secure the device 32 to the lever 30.

The devices 32 are shown in greater detail in FIGS. 5 and 6. They include a ridged section 36. The ridged section 36 is adapted to receive a fingertip to allow the lever 30 to be pulled or pushed conveniently. The functionality of the lever 30 will be further explained later.

Figure 7:
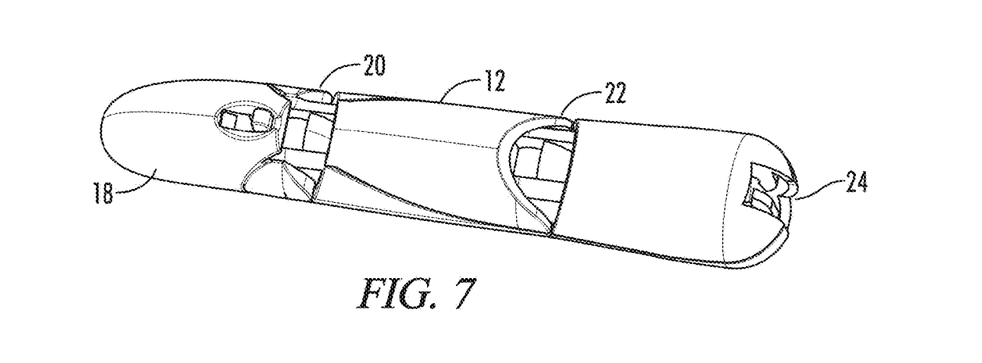
FIGS. 7, 8 and 9 are perspective views of a digit on the training hand in accordance with another aspect of the present invention.
Figure 8:
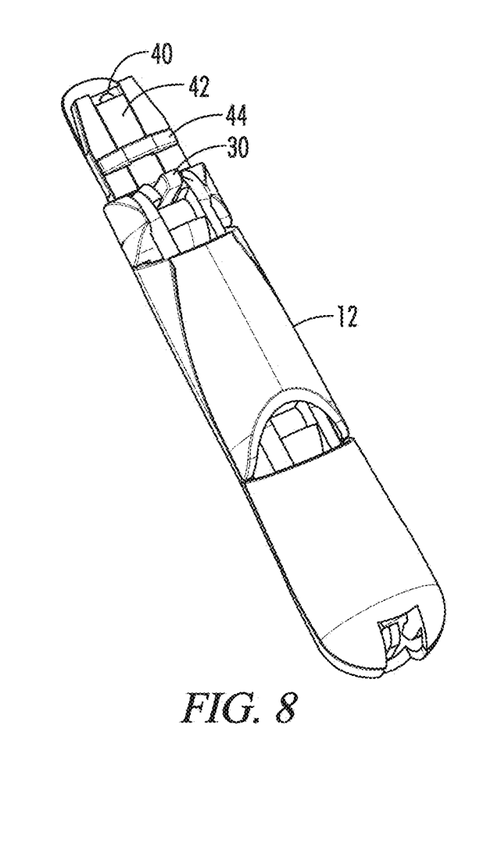
Figure 9:
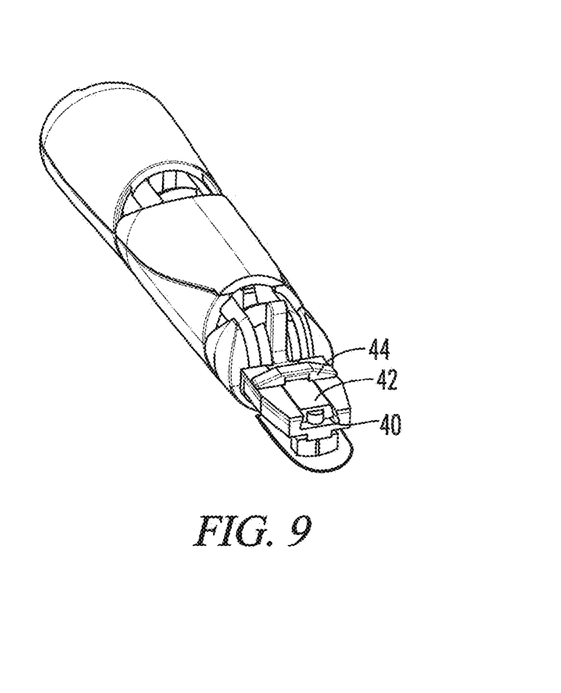

FIGS. 7, 8 and 9 are perspective views of a digit on the training hand in accordance with another aspect of the present invention. The finger 12 is shown in greater detail. FIG. 7 illustrates the fingertip 18 and the three joints 20, 22 and 24. FIG. 8 illustrates the finger 12 with a cap of the fingertip 18 removed to show the details of the construction of the fingertip 18. The fingertip 18 includes a channel 40 with a bar 42 in the channel 40. A bracket 44 is secured to the fingertip 18 on either side of the channel 40.

Figure 10:
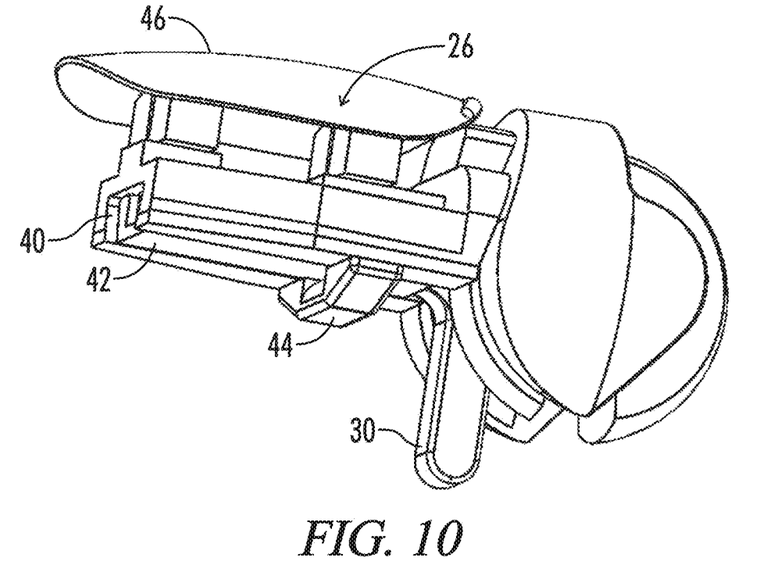
FIG. 10 is a perspective view of a fingertip of a digit on the training hand in accordance with a further aspect of the present invention.

FIG. 10 is a perspective view of the fingertip 18 in accordance with a further aspect of the present invention. The removable artificial nail 26 is mounted on the fingertip 18 with a surface of the nail 46 exposed.

Figure 11:
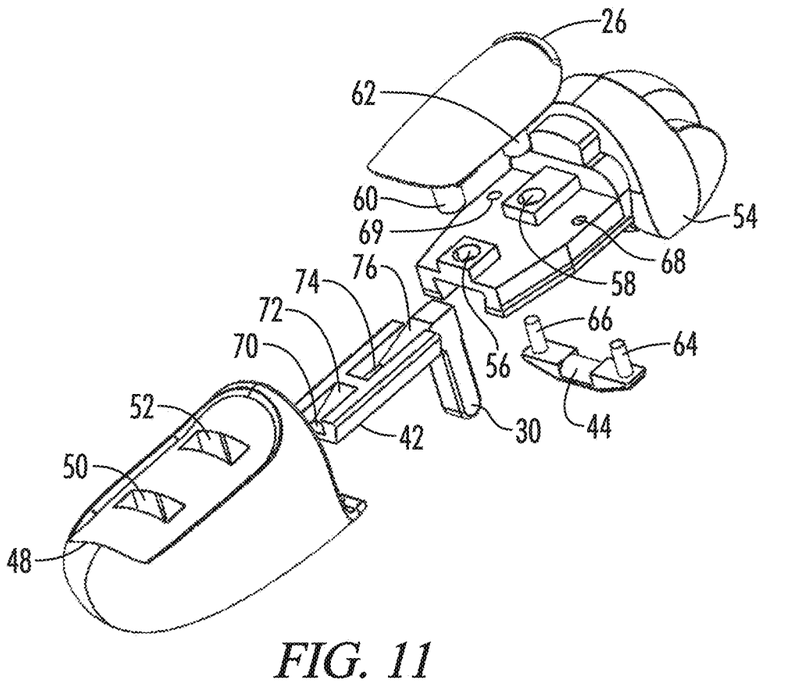
FIG. 11 is an exploded perspective view of the fingertip of FIG. 10.

FIG. 11 is an exploded perspective view of the fingertip 18 of FIG. 10 illustrating the mounting of the removable nail 26 to the fingertip 18 in accordance with an aspect of the present invention. A cap 48 has two holes 50 and 52. An inner assembly 54 also has two holes 56 and 58 which align with holes 50 and 52 when the cap 48 is assembled on the inner assembly 54.

The artificial nail 26 has two posts 60 and 62. These posts, when the nail 26 is assembled onto the fingertip 18, are put through holes 50 and 52, respectively, and then into the holes 56 and 58. The posts 60 and 62 are preferably tapered so that a diameter of the first and second posts nearer to the surface is greater than a diameter of the first and second posts further from the surface. When the posts 60 and 62 are inserted into the holes 56 and 58, respectively, the posts 60 and 62 are sized in relation to the holes to be retained in the holes 56 and 58 by a friction fit. Thus, the artificial nail 26 is securely held on the fingertip 18.

Bracket 44 has two posts 64 and 66. There are two holes 68 and 69, which are located on either side of the channel 40. The posts 64 and 66 are inserted into the two holes 68 and 69, respectively, by a friction fit. Thus, the bar 42 is secured within the channel 40 by the bracket 44 in a manner that permits the bar 42 to slide within the channel 40.

The bar has at least four surfaces 70, 72, 74 and 76. One of the surfaces 70 or 72, depending on whether the nail is being removed or not, is adjacent the post 60 when the fingertip 18 is assembled. Also one of the surfaces 74 or 76, depending on whether the nail 26 is being removed or not, is adjacent the post 62 when the fingertip 18 is assembled. The surfaces 70 and 74 are preferably flat so that they do not contact the bottom of the posts 60 and 62, respectively. However, the surfaces 70 and 74 do not have to be flat, as long as they do not contact the bottom of the posts 60 and 62, respectively. Thus, when the lever 30 is positioned toward the inner assembly 54, the posts 60 and 62 remain securely in their holes.

The surfaces 72 and 76 are inclined, and preferably ramped. These surfaces 72 and 76 are designed to come into contact with the bottom of the posts 60 and 62, respectively. As the bar 42 is moved forward, for example by applying pressure to the lever 30, the inclined surfaces 72 and 76 apply greater pressure to the bottom of the posts 60 and 62, respectively, eventually dislodging the posts 60 and 62 from their respective holes 56 and 58. The invention therefore provides for the efficient removal of the artificial nail 26.

In another embodiment, the surfaces 70 and 74 very lightly contact the posts 60 and 62, respectfully. The pressure that the surfaces 70 and 74 exert on the posts 60 and 62 in this embodiment, if any, is very light so as to not dislodge the posts 60 and 62 from their holes 56 and 58.

Figure 12:
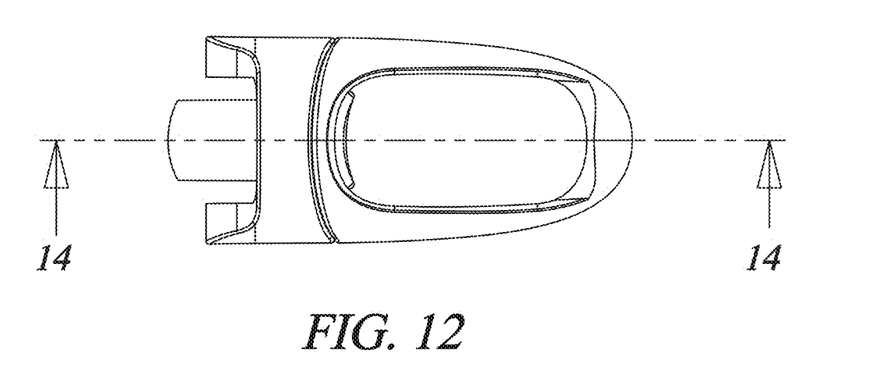
FIGS. 12, 13 and 14 are views of a fingertip with an artificial nail in an assembled position.
Figure 13:
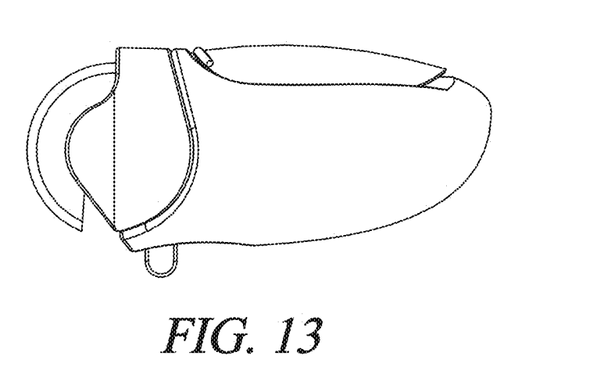
Figure 14:
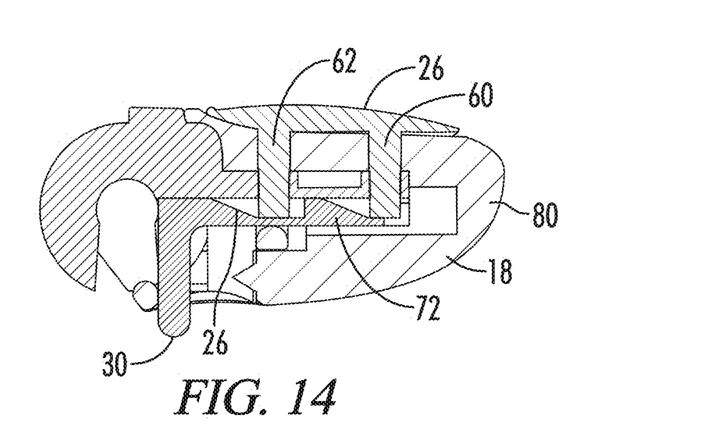

FIGS. 12, 13 and 14 are views of a fingertip with an artificial nail in an assembled position. FIG. 12 illustrates a top view of the fingertip 18 and FIG. 13 illustrates a side view of the fingertip 18. FIG. 14 is a cross sectional view of the indicated section in FIG. 12. These figures show the nail 26 in an inserted position in the fingertip 18.

Referring to FIG. 14, the relationships between the four surfaces 70, 72, 74 and 76 and the posts 60 and 62 are illustrated. In this secured position, the bottom of the post 60 is aligned with surface 70. The surface 70 either does not contact the bottom of the post 60 or alternatively makes very slight contact but exerts only a very small constant pressure against the bottom of the post 60. Similarly, in this secured position, the bottom of the post 62 is aligned with surface 74. The surface 74 either does not contact the bottom of the post 64 or alternatively makes very slight contact but exerts a very small constant pressure against the bottom of the post 64.

Figure 15:
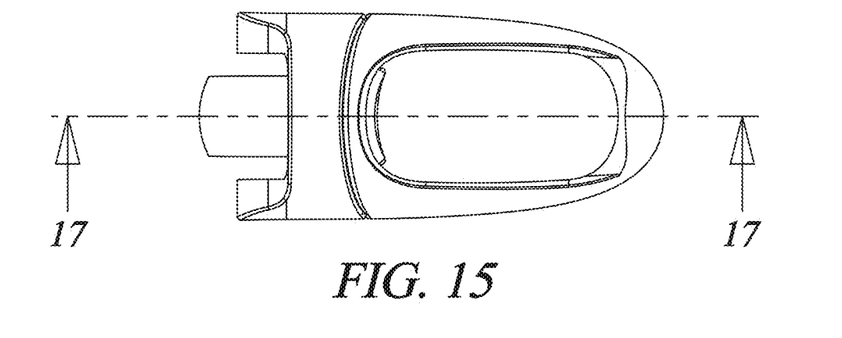
FIGS. 15, 16 and 17 are views of a fingertip with an artificial nail in an unassembled position.
Figure 16:
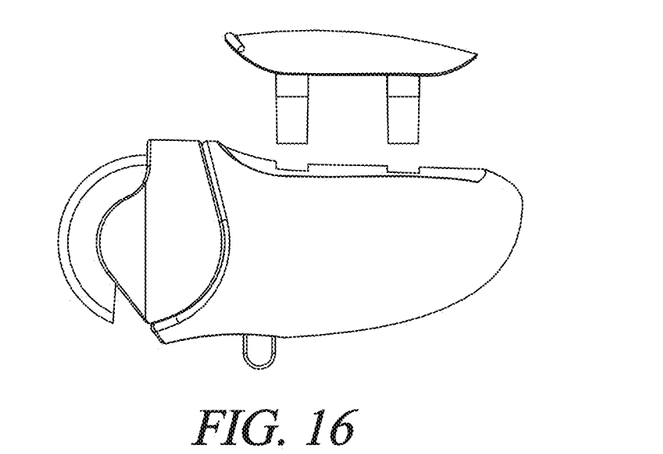
Figure 17:
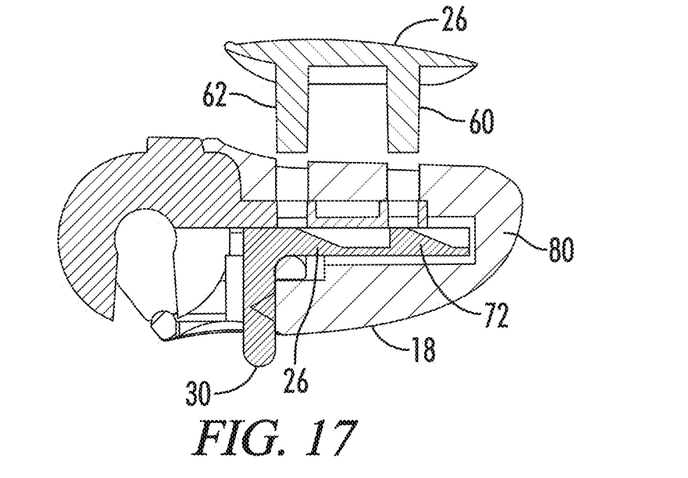

The removal of the artificial nail 26 is shown in FIGS. 15, 16 and 17. FIG. 15 is a top view of the fingertip 18 with the artificial nail 26 removed. FIG. 16 is a side view of the fingertip 18 with the artificial nail 26 removed. FIG. 17 is a cross sectional view of the fingertip 18 along the lines shown in FIG. 15. In FIG. 17, the lever 30 is pushed toward the front 80 of the fingertip 18. The post 60 slides along the ramp 72 and the post 62 slides along the ramp 76, causing increasing pressure to be put on the posts 60 and 62. This pressure pops the posts 60 and 62 out of their respective holes 56 and 58, and allows the artificial nail 26 to be removed.

Figure 18:
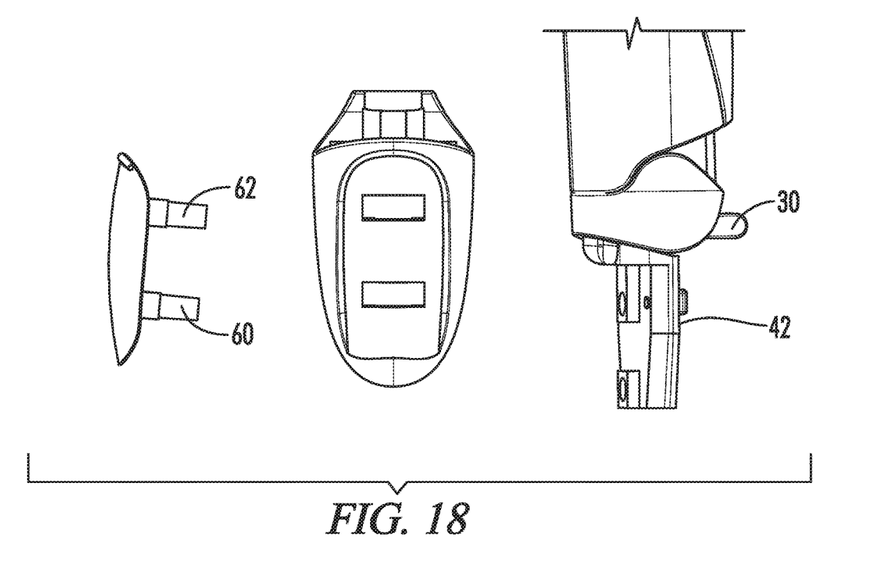
FIGS. 18, 19 and 20 further illustrate the operation of the device in accordance with the present invention.
Figure 19:
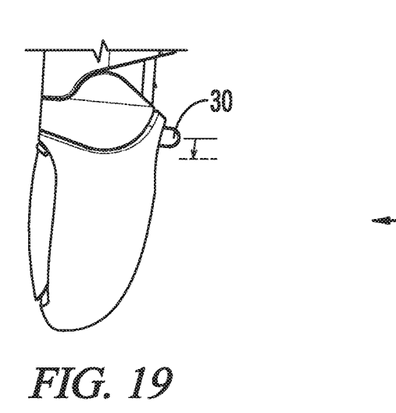
Figure 20:
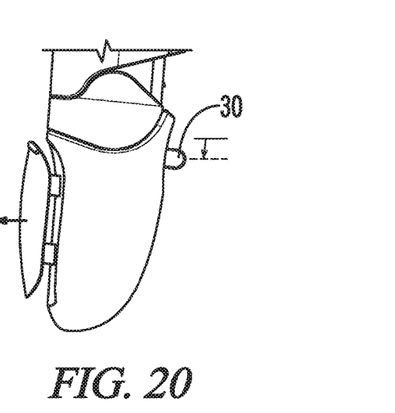

FIGS. 18, 19 and 20 further illustrate the operation of the device in accordance with the present invention. The lever 30 is pulled forward as illustrated in FIG. 19. As previously described, the ramped surfaces of the bar 42 exert pressure on the posts 60 and 62 to break the friction grip on the taper posts 60 and 62, allowing the artificial nail to be removed.

Although the best mode contemplated for carrying out the present invention has been herein shown and described, it will be apparent that modification and variation may be made without departing from what is regarded to be the subject matter of the invention.

The invention claimed is:

1. A training device comprising:
   an artificial tip having a channel and a first and a second hole leading into the channel;
   an artificial nail having a surface simulating a nail and a first and a second post extending away from the surface, the first post and the second post fitting into the first hole and into the second hole, respectively, in a friction fit, the first post and the second post extending into the channel and the surface being exposed on the artificial tip;
   a bar slidably mounted in the channel, the bar comprising:
      a first surface shaped to not contact the first post, or to exert a small constant pressure on the first post, when the first surface is aligned with the first post;
      a second surface with an incline that contacts the first post with increasing pressure as the bar slides in a direction in the channel;
      a third surface shaped to not contact the second post, or to exert a small constant pressure on the second post, when the third surface is aligned with the second post;
      a fourth surface with an incline that contacts the second post with increasing pressure as the bar slides in the direction in the channel;
      a lever.

2. The training device of claim 1, wherein the lever extends outside the artificial tip.

3. The training device of claim 1, wherein the first surface and the second surface have the same shape.

4. The training device of claim 1, wherein the second surface and the fourth surface have the same shape.

5. The training device of claim 4, wherein the second surface and the fourth surface are ramp shaped.

6. The training device of claim 1, wherein the artificial tip is a fingertip.

7. The training device of claim 1, wherein the artificial tip is a toe tip.

8. The training device of claim 1, wherein the first and the second posts are tapered so that a diameter of the first and second posts nearer to the surface is greater than a diameter of the first and second posts further from the surface.

9. The training device of claim 1, wherein when the lever is moved, the bar slides in the channel in the direction so that the first post and the second post are removed from the first hole and the second hole, respectively.

10. The training device of claim 1, further comprising a bracket attached to the artificial tip on a first side of the channel and attached to the artificial tip on a second side of the channel so that the bracket spans across the channel and retains the mechanism in the channel.

11. The training device of claim 1, further comprising an artificial digit attached to the artificial fingertip to simulate a finger.

12. The training device of claim 11, further comprising an artificial hand attached to the artificial digit to simulate a hand.

13. The training device of claim 12, further comprising a pedestal attached to the artificial hand that supports the hand.

14. The training device of claim 12, further comprising four artificial digits attached to the hand, each of the four artificial digits having an artificial fingertip with a corresponding bar slidably mounted in a corresponding channel.

15. The training device of claim 13, further comprising four artificial digits attached to the hand, each of the four artificial digits having an artificial fingertip with a corresponding bar slidably mounted in a corresponding channel.

16. The training device of claim 1, further comprising a ridged cover on the lever.

\* \* \* \* \*